US012748533B2

(12) United States Patent
Li

(10) Patent No.: US 12,748,533 B2
(45) Date of Patent: Sep. 29, 2026

(54) DATA STORAGE DEVICE AND DECODING COMBINATION SELECTING METHOD

(71) Applicant: Silicon Motion, Inc., Jhubei City (TW)

(72) Inventor: Fa-Hao Li, Zhubei City (TW)

(73) Assignee: Silicon Motion, Inc., Jhubei City (TW)

( * ) Notice: Subject to any disclaimer, the term of this patent is extended or adjusted under 35 U.S.C. 154(b) by 55 days.

(21) Appl. No.: 19/026,569

(22) Filed: Jan. 17, 2025

(65) Prior Publication Data

US 2026/0133700 A1 May 14, 2026

(30) Foreign Application Priority Data

Nov. 11, 2024 (CN) ......................... 202411604107.7

(51) Int. Cl.
*G06F 3/06* (2006.01)

(52) U.S. Cl.
CPC .......... *G06F 3/0619* (2013.01); *G06F 3/0653* (2013.01); *G06F 3/0659* (2013.01); *G06F 3/0679* (2013.01)

(58) Field of Classification Search
CPC .... G06F 3/0619; G06F 3/0653; G06F 3/0659; G06F 3/0679
See application file for complete search history.

(56) References Cited

U.S. PATENT DOCUMENTS

| | | | | |
|---|---|---|---|---|
| 2015/0095741 A1* | 4/2015 | Lin | G06F 11/1048 | 714/773 |
| 2017/0206130 A1* | 7/2017 | Hsiao | G06F 11/1068 | |
| 2018/0173432 A1* | 6/2018 | Han | G06F 3/0611 | |
| 2019/0362796 A1* | 11/2019 | Choi | G06F 11/1072 | |

* cited by examiner

*Primary Examiner* — Aracelis Ruiz

(57) ABSTRACT

Provided are a data storage device and a decoding combination selecting method. The data storage device includes a non-volatile memory and a processing circuit. The non-volatile memory includes a plurality of blocks. Each block includes a plurality of pages. A decoding combination selecting method is executed by the processing circuit to include: periodically reading a page in the non-volatile memory to update state parameters of a first block including the page in a block state table; and selecting one of a plurality of decoding combinations based on the state parameters of the first block in the block state table to decode the first block. The state parameters include a charge leakage degree value, a potential offset degree value, a first offset voltage and a second offset voltage, and a first bit number and a second bit number respectively corresponding to the first offset voltage and the second offset voltage.

12 Claims, 2 Drawing Sheets

DATA STORAGE DEVICE AND DECODING COMBINATION SELECTING METHOD

CROSS-REFERENCE TO RELATED PATENT APPLICATION

This application claims priority to China Patent Application No. 202411604107.7, filed on Nov. 11, 2024. The entire contents of China Patent Application No. 202411604107.7 is incorporated herein by reference.

FIELD OF THE INVENTION

The disclosure relates to a data storage device and a data decoding method, and in particular to a data storage device and a decoding combination selecting method.

BACKGROUND OF THE INVENTION

A flash memory is a non-volatile memory characterized by no loss of data after a power failure. Unlike the traditional random access memory (RAM), the flash memory cannot be overwritten, that is, it cannot be directly modified on the original data, and the entire block needs to be erased before new data can be written.

The basic storage unit in the flash memory is "cell", a plurality of cells form a "page", a plurality of pages form a "block", a plurality of blocks further form a "plane", a plurality of planes form a "die", and ultimately a nand flash is formed. Pages are the smallest unit that can be read from or written to a flash memory. "Blocks" in the flash memory refer to the basic unit for a nand flash to perform an erase operation.

Since an erase operation is performed in blocks instead of byte by byte, additional operations may occur when updating data, which may affect the write performance. However, this can make the nand flash manage the storage space efficiently when storing a large amount of data.

In a flash memory, a "first read issue" typically refers to an abnormality such as inaccuracy, instability, or slower read speed than subsequent read operations when a piece of data is read for the first time after it is written to the flash memory. Possible causes of the first read issue include unstable charge distribution, poor initialization process, insufficient precharge, etc.

How to solve the first read issue of the flash memory and learn a status of each block in the flash memory to provide a decoding combination suitable for the state of the flash memory is the technical problem to be solved in the art.

SUMMARY OF THE INVENTION

The disclosure provides a data storage device and a decoding combination selecting method thereof, which can solve the first read issue of the flash memory and learn a status of each block in the flash memory to provide a decoding combination suitable for the state of the flash memory.

The data storage device provided by the disclosure includes: a non-volatile memory; and a processing circuit coupled to the non-volatile memory. The processing circuit executes a decoding combination selecting method of a data storage device, including: periodically reading a page in the non-volatile memory to update state parameters of a first block including the page in a block state table; and selecting one of a plurality of decoding combinations based on the state parameters of the first block in the block state table to decode the first block. The state parameters include a charge leakage degree value, a potential offset degree value, a first offset voltage and a second offset voltage, and a first bit number and a second bit number respectively corresponding to the first offset voltage and the second offset voltage.

According to the decoding combination selecting method of a data storage device provided by the disclosure, the data storage device includes a non-volatile memory and a processing circuit, the non-volatile memory includes a plurality of blocks, each block includes a plurality of pages, and a decoding combination selecting method is executed by the processing circuit to include: periodically reading a page in the non-volatile memory to update state parameters of a first block including the page in a block state table; and selecting one of a plurality of decoding combinations based on the state parameters of the first block in the block state table to decode the first block. The state parameters include a charge leakage degree value, a potential offset degree value, a first offset voltage and a second offset voltage, and a first bit number and a second bit number respectively corresponding to the first offset voltage and the second offset voltage.

In an example of the disclosure, the page in the non-volatile memory is periodically read through the first offset voltage and the second offset voltage to acquire the first bit number and the second bit number of a bit.

In an example of the disclosure, the first bit number and the second bit number are numbers of bits 0 or bits 1.

In an example of the disclosure, a third offset voltage and hardware decoding are selected to decode the first block based on the charge leakage degree value of the first block in the block state table being less than or equal to a first threshold; and the third offset voltage and software decoding are selected to decode the first block based on the charge leakage degree value of the first block in the block state table being greater than the first threshold.

In an example of the disclosure, a fourth offset voltage and hardware decoding are selected to decode the first block based on the potential offset degree value of the first block in the block state table being less than or equal to a second threshold; and a fifth offset voltage and software decoding are selected to decode the first block based on the potential offset degree value of the first block in the block state table being greater than the second threshold.

In an example of the disclosure, an offset voltage range of at least one read potential includes the first offset voltage and the second offset voltage.

The disclosure solves the first read issue of the data storage device by periodically reading the non-volatile memory and learns the status of each block in the data storage device by using the block state table to provide the decoding combination suitable for the state of the data storage device, so that the read count can be effectively reduced, thereby reducing the read disturb, effectively lowering the influence of the first read and adopting a more accurate reread strategy or decoding strategy.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
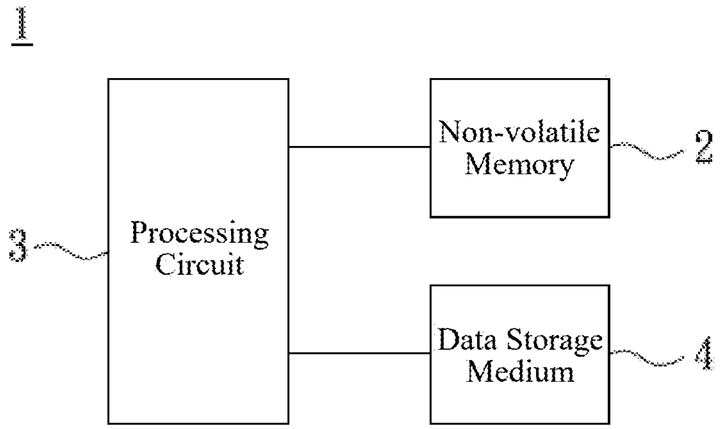
FIG. 1 is a system block diagram of a data storage device provided by an example of the disclosure.

The present invention is particularly described with the following examples, which are merely for illustration. For those skilled in the art, various modifications and refinements can be made without departing from the spirit and scope of this disclosure. Therefore, the scope of protection of this disclosure shall be defined by the appended claims. Throughout the specification and claims, unless clearly specified otherwise, the meaning of "a" and "the" includes "one or at least one" element or component. In addition, as used in the present invention, unless it is clearly apparent from the context that the plural is excluded, the singular also includes the plural elements or components. Additionally, when used in this description and all the following claims, unless clearly specified otherwise, "therein" can mean "in" and "on". The terms used throughout this specification and claims, unless specifically noted, usually have their ordinary meanings in the field, in the context of this disclosure, and in the specific context. Some terms used to describe the present invention will be discussed below or elsewhere in this specification to provide additional guidance to a practitioner regarding the description of the present invention. Any examples given anywhere throughout the specification, including the use of any terms discussed herein, are merely for description and do not limit the scope and meaning of the present invention or any exemplified terms. Likewise, the present invention is not limited to the various embodiments proposed in this specification.

As used herein, the terms "substantially," "around," "about," or "approximately" should generally mean within 20% of a given value or range, preferably within 10%. Furthermore, quantities provided herein may be approximate, meaning that unless specifically stated otherwise, they can be expressed using the terms "about," "around," or "approximately." When a range, a preferred range, or a set of upper and lower ideal values are specified for quantities, concentrations, or other values or parameters, it should be considered that all ranges formed by any pair of upper and lower limits or ideal values are specifically disclosed, regardless of whether such ranges are separately disclosed. For example, if a range of a length is disclosed as X cm to Y cm, it should be considered as disclosing a length of H cm, where H can be any real number between X and Y.

Furthermore, if a term "coupled" or "connected" is used herein, it includes any direct and indirect electrical connection measures. For example, a text describes that a first apparatus is electrically coupled to a second apparatus, meaning that the first apparatus may be connected to the second apparatus directly or indirectly via through other apparatuses or connection measures. Additionally, if a description involves transmission or provision of electrical signals, those skilled in the art should understand that the transmission of electrical signals may be accompanied by attenuation or other non-ideal changes, but unless specifically stated otherwise, the electrical signals transmitted or provided from sources to receiving ends should be considered as substantially the same signal. For example, in a case that an electrical signal S is transmitted (or provided) from an endpoint A of an electronic circuit to an endpoint B, where it may pass by the source and drain terminals of a transistor switch and/or a possible stray capacitor, causing a voltage drop, but if the objective of such design is not to intentionally use the attenuation or other non-ideal changes during transmission (or provision) to achieve certain technical effects, the electrical signal S at the endpoint A and the electrical signal S at the endpoint B of the electronic circuit should be considered substantially the same signal.

It can be understood that the terms "comprising," "including," "having," "containing," "involving," and the like as used herein are open-ended, meaning inclusion but being not limited thereto. Additionally, any embodiment or claim of the present invention does not have to achieve all the objectives, advantages, or features disclosed in the present invention. Furthermore, the abstract and title are only for assisting in patent document searches and are not intended to limit the claims of the present invention.

FIG. 1 is a system block diagram of a data storage device provided by an example of the disclosure. The data storage device 1 provided by this example includes a non-volatile memory 2, a processing circuit 3 and a data storage medium 4. The non-volatile memory 2 includes a plurality of blocks, the data storage medium 4 stores a plurality of instructions, and the processing circuit 3 is coupled to the non-volatile memory 2 and the data storage medium 4. The processing circuit 3 executes the plurality of instructions to implement a decoding combination selecting method of a data storage device to access a plurality of pages in the plurality of blocks of the non-volatile memory 2.

According to an example of the disclosure, the data storage device 1 may be a flash memory, which may be a memory using Universal Serial Bus (USB), Serial Advanced Technology Attachment (SATA), Parallel Advanced Technology Attachment (PATA) or Peripheral Component Interconnect (PCI) physical interface, or using USB, Non-Volatile Memory Express (NVME), Advanced Host Controller Interface (AHCI) or Small Computer System Interface (SCSI) communication protocol, such as a memory card, a USB flash device, a Solid-state Drive (SSD), an embedded MultiMedia Card (eMMC), etc.

According to an example of the disclosure, the non-volatile memory 2 is, for example, but not limited to, a NAND flash memory, and the types of the NAND flash memory include, for example, but not limited to, Single-Level Cell (SLC), Multi-Level Cell (MLC), Triple-Level Cell (TLC), Quad-level cell (QLC), etc.

According to an example of the disclosure, the processing circuit 3 is, for example, but not limited to, a processor, a microprocessor or the like, which is configured to execute write, read, erase and program of the non-volatile memory 2 according to a command of a master, such as a host, and automatically execute the decoding combination selecting method of the data storage device 1 provided by an example of the disclosure.

Figure 2:
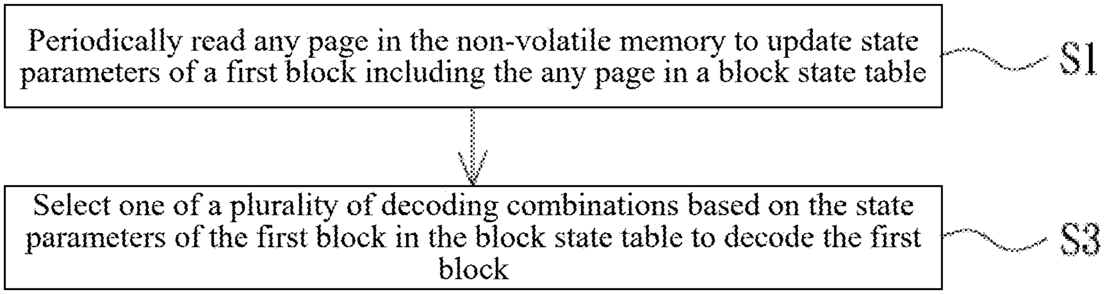
FIG. 2 is a flowchart of a decoding combination selecting method provided by an example of the disclosure.

FIG. 2 shows a flowchart of the decoding combination selecting method provided by an example of the disclosure. The decoding combination selecting method of the data storage device 1 provided by this example is executed by the processing circuit 3 and includes steps as follows.

Step S1: Periodically read a page in the non-volatile memory 2 to update state parameters of a first block including the page in a block state table. The state parameters include a charge leakage degree value a(VT_i), a potential offset degree value c(VT_i), a first offset voltage V1 and a second offset voltage V2 in an offset voltage range of at least one read potential, and a first bit number B1 and a second bit number B2 respectively corresponding to the first offset voltage V1 and the second offset voltage V2, as shown in Table 1.

TABLE 1

Block state table of non-volatile memory

| Block | P1 (V1, B1) | P2 (V2, B2) | a(VT_i) | c(VT_i) |
|---|---|---|---|---|
| 0 | | | | |
| 1 | | | | |
| . . . | | | | |
| 100 | (−4, 8616) | (4, 9816) | 150 | 9216 |
| . . . | | | | |

In detail, in an ordinary flash memory apparatus, blocks in the same position in multiple planes of multiple dies may be designed as a superblock. Limited by the memory or computing resources of the flash memory apparatus, superblocks or blocks will be used as a management granularity for the reason that blocks of the same granularity will have similarities. The example of the disclosure is not limited to the management of the granularity of blocks, but may lie in maintaining a block state table, recording results of read potentials of unit blocks to avoid the first read issue by using these read results, and constructing offset voltage distribution of different blocks at different read potentials by acquiring a plurality of bit numbers by issuing a different read command each time.

It can be noted that the read is performed periodically, for example, every t seconds. A read command is sent to pages of different blocks (which may be the worst page, a randomly selected page or a preset page), then an offset voltage is set and bit data is read out, and the bit numbers of different blocks are counted.

Table 1 is an example of reading one page in the non-volatile memory 2 at 1 read potential, where assuming that the read potential is 0 V and the bits being read are bit 1, then P1 represents one point in the offset voltage range of the read potential, which includes an offset voltage V1 (such as −4 V) and a bit number B1 obtained at the offset voltage V1, and P2 represents another point in the offset voltage range of the read potential, which includes an offset voltage V2 (such as 4 V) and a bit number B2 obtained at the offset voltage V2. Next, by bringing (V1, B1) and (V2, B2) to a linear equation in one variable B=aV+c, the slope value a(VT_i) and the offset value c(VT_i) can be calculated, where a(VT_i) represents the charge leakage degree value, c(VT_i) represents the potential offset degree value, and VT_i represents the value corresponding to the i-th potential. It can be noted that only one potential is listed in Table 1, and the disclosure may be applied to other cells, such as SLC with 1 potential, MLC with 3 potential, TLC with 7 potentials and QLC with 15 potentials.

Here, according to the characteristics of the flash memory, different pages in the same block have similarities, so the block including this page, such as the 100-th block, can be represented states by the offset voltage distribution of one read potential of this page. Then, it can be further inferred that blocks of different flash memory types or specifications can be represented states by the offset voltage distribution of one potential or multiple potentials of one page or multiple pages, and thereby, the decoding combination for decoding can be selected.

Specifically, step S1 is to periodically read the page in the non-volatile memory 2 through the first offset voltage (e.g., V1 in Table 1) and the second offset voltage (e.g., V2 in Table 1) of at least one read potential to acquire the first bit number (e.g., B1 in Table 1) and the second bit number (e.g., B2 in Table 1) of a bit, where the bit may be bit 0 or bit 1, and the first bit number and the second bit number may be the numbers of bits 0 or bits 1.

That is, according to the disclosure, at least one read command is sent at a time, and multiple offset voltages and bit numbers thereof can be obtained by sending a read command for multiple times, thereby constructing the offset voltage range. Moreover, according to the disclosure, at least two read commands are sent to acquire at least two offset voltages and bit numbers thereof to construct the state parameters of the block. In addition, according to the disclosure, there is no limit for sending read commands, so multiple offset voltages and bit numbers can be acquired to construct a more accurate voltage distribution map (for example, by using a multi-power equation in multiple variables), and thereby, higher-order equations can be calculated by using algorithms of machine learning.

Figure 3:
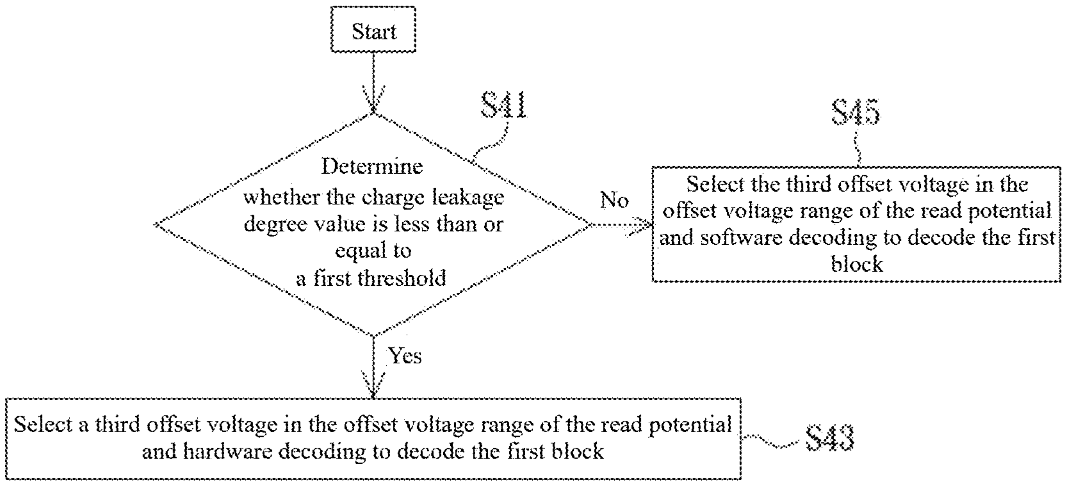
FIG. 3 is a flowchart of selection from a plurality of decoding combinations provided by an example of the disclosure.
Figure 4:
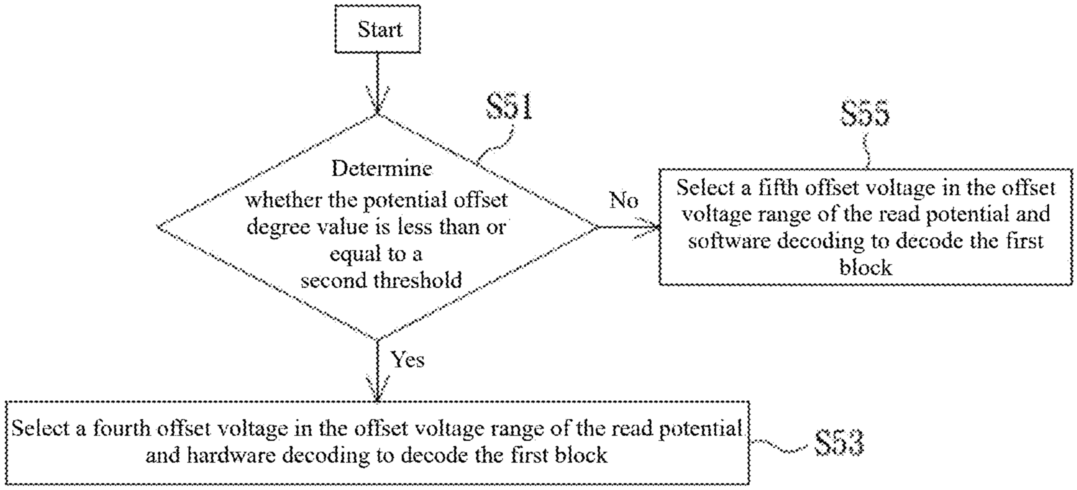
FIG. 4 is a flowchart of selection from a plurality of decoding combinations provided by another example of the disclosure.

Step S3: Select one of a plurality of decoding combinations based on the state parameters of the first block in the block state table to decode the first block. FIG. 3 is a flowchart of selection from a plurality of decoding combinations provided by an example of the disclosure. The selection from a plurality of decoding combinations provided by this example includes steps as follows. Step S41: Determine whether the charge leakage degree value a(VT_i) is less than or equal to a first threshold. Step S43: If so, select a third offset voltage in the offset voltage range of the read potential and hardware decoding to decode the first block. Step S45: If not, select the third offset voltage in the offset voltage range of the read potential and software decoding to decode the first block. In this example, the first threshold is substantially 100, but those skilled in the art can design the first threshold according to the actual state of the data storage device 1, and the disclosure is not limited to this. FIG. 4 is a flowchart of selection from a plurality of decoding combinations provided by another example of the disclosure. The selection from a plurality of decoding combinations provided by this example includes steps as follows. Step S51: Determine whether the potential offset degree value c(VT_i) is less than or equal to a second threshold. Step S53: If so, select a fourth offset voltage in the offset voltage range of the read potential and hardware decoding to decode the first block. Step S55: If not, select a fifth offset voltage in the offset voltage range of the read potential and software decoding to decode the first block. In this example, the second threshold is substantially 8000, but those skilled in the art can design the second threshold according to the actual state of the data storage device 1, and the disclosure is not limited to this. In addition, the disclosure does not limit that the third offset voltage, the fourth offset voltage and the fifth offset voltage are the same or different.

That is, according to the decoding combination selecting method of the data storage device 1 provided by the disclosure, the third offset voltage in the offset voltage range of the read potential and hardware decoding may be selected to decode the first block based on the charge leakage degree value of the first block in the block state table being less than or equal to the first threshold; and the third offset voltage in the offset voltage range of the read potential and software decoding may be selected to decode the first block based on the charge leakage degree value of the first block in the block state table being greater than the first threshold.

Moreover, according to the decoding combination selecting method of the data storage device 1 provided by the disclosure, the fourth offset voltage in the offset voltage range of the read potential and hardware decoding may also be selected to decode the first block based on the potential offset degree value of the first block in the block state table being less than or equal to the second threshold; and the fifth offset voltage in the offset voltage range of the read potential and software decoding may also be selected to decode the first block based on the potential offset degree value of the first block in the block state table being greater than the second threshold.

It can be noted that the determinations of step S41 in FIG. 3 and step S51 in FIG. 4 may be performed at the same time, so that when the charge leakage degree value a(VT_i) is less than or equal to the first threshold and the potential offset degree value c(VT_i) is less than or equal to the second threshold, a sixth offset voltage in the offset voltage range of the read potential and hardware decoding are selected to decode the first block; when the charge leakage degree value a(VT_i) is less than or equal to the first threshold and the potential offset degree value c(VT_i) is greater than the second threshold, a seventh offset voltage in the offset voltage range of the read potential and hardware decoding may be selected to decode the first block; when the charge leakage degree value a(VT_i) is greater than the first threshold and the potential offset degree value c(VT_i) is less than or equal to the second threshold, an eighth offset voltage in an offset voltage range of another read potential and software decoding may be selected to decode the first block; and when the charge leakage degree value a(VT_i) is greater than the first threshold and the potential offset degree value c(VT_i) is greater than the second threshold, a ninth offset voltage in the offset voltage range of another read potential and software decoding may be selected to decode the first block.

It should be noted that the representations of FIG. 3 and FIG. 4 are only exemplary. Those skilled in the art can design decoding combinations when the charge leakage degree value a(VT_i) is greater than, less than or equal to the first threshold and the potential offset degree value c(VT_i) is greater than, less than or equal to the second threshold according to the history decoding state of the data storage device 1, and the disclosure is not limited to the contents of the decoding combinations. For example, those skilled in the art can sequentially select one of the decoding combinations, for example, re-selecting a read potential (and/or an offset voltage therein) in combination with hardware decoding, re-searching a read potential (and/or an offset voltage therein) in combination with hardware decoding, re-selecting a read potential (and/or an offset voltage therein) in combination with software decoding, re-searching a read potential (and/or an offset voltage therein) in combination with software decoding, etc., to decode the block according to the history decoding state of the data storage device 1.

In addition, in addition to the non-volatile memory 2, the processing circuit 3 and the data storage medium 4, the data storage device 1 provided by the disclosure may further additionally include a digital circuit to count the bit number in a buffer area and directly acquire the bit count by returning two bytes rather than by returning all the data to the processing circuit 3, thus avoiding the occupation of the bus.

Based on the above, the disclosure solves the first read issue of the data storage device by periodically reading the non-volatile memory and learns the status of each block in the data storage device by using the block state table to provide the decoding combination suitable for the state of the data storage device, so that the read count can be effectively reduced, thereby reducing the read disturb, effectively lowering the influence of the first read and adopting a more accurate reread strategy or decoding strategy.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A decoding combination selecting method of a data storage device, the data storage device comprising a non-volatile memory and a processing circuit, the non-volatile memory comprising a plurality of blocks, each block comprising a plurality of pages, and a decoding combination selecting method being executed by the processing circuit to comprise:

periodically reading a page in the non-volatile memory to update state parameters of a first block comprising the page in a block state table; and selecting one of a plurality of decoding combinations based on the state parameters of the first block in the block state table to decode the first block;

wherein the state parameters comprise a charge leakage degree value, a potential offset degree value, a first offset voltage and a second offset voltage, and a first bit number and a second bit number respectively corresponding to the first offset voltage and the second offset voltage.

2. The decoding combination selecting method of a data storage device according to claim 1, wherein the page in the non-volatile memory is periodically read through the first offset voltage and the second offset voltage to acquire the first bit number and the second bit number of a bit.

3. The decoding combination selecting method of a data storage device according to claim 2, wherein the first bit number and the second bit number are numbers of bits 0 or bits 1.

4. The decoding combination selecting method of a data storage device according to claim 1, wherein a third offset voltage and hardware decoding are selected to decode the first block based on the charge leakage degree value of the first block in the block state table being less than or equal to a first threshold; and the third offset voltage and software decoding are selected to decode the first block based on the charge leakage degree value of the first block in the block state table being greater than the first threshold.

5. The decoding combination selecting method of a data storage device according to claim 1, wherein a fourth offset voltage and hardware decoding are selected to decode the first block based on the potential offset degree value of the first block in the block state table being less than or equal to a second threshold; and a fifth offset voltage and software decoding are selected to decode the first block based on the potential offset degree value of the first block in the block state table being greater than the second threshold.

6. The decoding combination selecting method of a data storage device according to claim 1, wherein an offset voltage range of at least one read potential comprises the first offset voltage and the second offset voltage.

7. A data storage device, comprising:

a non-volatile memory; and a processing circuit, coupled to the non-volatile memory;

wherein the processing circuit executes a decoding combination selecting method of a data storage device, comprising:

periodically reading a page in the non-volatile memory to update state parameters of a first block comprising the page in a block state table; and selecting one of a plurality of decoding combinations based on the state parameters of the first block in the block state table to decode the first block;

wherein the state parameters comprise a charge leakage degree value, a potential offset degree value, a first offset voltage and a second offset voltage, and a first bit number and a second bit number respectively corresponding to the first offset voltage and the second offset voltage.

8. The data storage device according to claim 7, wherein the page in the non-volatile memory is periodically read through the first offset voltage and the second offset voltage to acquire the first bit number and the second bit number of a bit.

9. The data storage device according to 8, wherein the first bit number and the second bit number are numbers of bits 0 or bits 1.

10. The data storage device according to claim 7, wherein a third offset voltage and hardware decoding are selected to decode the first block based on the charge leakage degree value of the first block in the block state table being less than or equal to a first threshold; and the third offset voltage and software decoding are selected to decode the first block based on the charge leakage degree value of the first block in the block state table being greater than the first threshold.

11. The data storage device according to claim 7, wherein a fourth offset voltage and hardware decoding are selected to decode the first block based on the potential offset degree value of the first block in the block state table being less than or equal to a second threshold; and a fifth offset voltage and software decoding are selected to decode the first block based on the potential offset degree value of the first block in the block state table being greater than the second threshold.

12. The data storage device according to claim 7, wherein an offset voltage range of at least one read potential comprises the first offset voltage and the second offset voltage.

* * * * *